US005668333A

United States Patent [19]

Horton et al.

[11] Patent Number: 5,668,333

[45] Date of Patent: Sep. 16, 1997

[54] MUSICAL RAINBOW TOY

[75] Inventors: Gregory R. Horton, Manville; Robert S. Winslow, Newport, both of R.I.

[73] Assignee: Hasbro, Inc., Pawtucket, R.I.

[21] Appl. No.: 658,360

[22] Filed: Jun. 5, 1996

[51] Int. Cl.$^{6}$ ........................ G09B 15/00

[52] U.S. Cl. ........................ 84/470 R; 84/477 R; 84/600; 84/94.2; 446/175; 446/297

[58] Field of Search ........................ 84/470 R, 600, 84/601, 602, 477 R, 95.2, 94.2; 446/175, 297

[56] References Cited

U.S. PATENT DOCUMENTS

| | | | |
|---|---|---|---|
| 3,849,931 | 11/1974 | Gulley, Jr. | 46/244 |
| 4,344,346 | 8/1982 | Erickson et al. | 84/1.18 |
| 4,757,491 | 7/1988 | Koike | 369/63 |
| 4,934,079 | 6/1990 | Hoshi | 40/427 |
| 4,968,877 | 11/1990 | McAvinney et al. | 250/221 |
| 5,081,896 | 1/1992 | Hiyoshi et al. | 84/600 |
| 5,158,492 | 10/1992 | Rudell et al. | 446/175 |
| 5,214,232 | 5/1993 | Iijima et al. | 84/724 |
| 5,216,193 | 6/1993 | Masubuchi | 84/600 |

OTHER PUBLICATIONS

"Make It and Break It" page article, Profiles, Nov. 1995.

"What's New" article from Popular Science magazine, pp. 8–9, Feb. 1996.

Exhibit 1—Date Code of Casio Model ML–1.

*Primary Examiner*—Cassandra C. Spyrou
*Assistant Examiner*—Shih-yung Hsieh
*Attorney, Agent, or Firm*—Marshall, O'Toole, Gerstein, Murray & Borun

[57] ABSTRACT

A musical toy is provided with a base member, a second member connected to the base member so as to form a substantially unobstructed space between the second member and the base member, a plurality of photoemitters for generating a plurality of radiation beams between the base member and the second member, a plurality of photodetectors for receiving the radiation beams, audio generation means for generating a plurality of musical sounds, and means for causing the audio generation means to generate one of the musical sounds in response to an interruption of one of the radiation beams.

17 Claims, 6 Drawing Sheets

MUSICAL RAINBOW TOY

BACKGROUND OF THE INVENTION

The present invention relates to a musical rainbow toy which allows a child to play songs and notes by selectively interrupting radiation beams generated by the toy.

Electronic musical instruments have been designed to allow a user to play individual musical notes during a song automatically played by the instrument, or to play individual musical notes separately. One example of such a musical instrument is the Casio Model ML-1, which is basically an electronic keyboard that simulates a piano. In addition to the piano-like keys of the keyboard, the Casio product has five tone buttons which allow a user to select any of twenty-five different musical instruments which can be electronically emulated, depending on what combination of the tone buttons are pressed by the user. For example, if the user selects the combination of tone buttons corresponding to a violin, each time one of the keyboard keys is pressed, the musical note generated by the Casio product will sound like, or emulate, a musical note of a violin.

The Casio product has a number of different operating modes. In a first operating mode referred to as a "play" mode, the Casio product simply plays the musical notes corresponding to the keys of the keyboard pressed by the user. In a second operating mode referred to as a "demo" mode, the Casio product automatically plays one of a number of various songs, as selected by the user, and also simultaneously plays musical notes corresponding to the keys of the keyboard pressed by the user.

Each of the white keys of the Casio product keyboard has an internal light which may be selectively turned on to illuminate the key. In a third operating mode referred to as an "any-key play" mode, the Casio product causes the keys to be illuminated, one at a time, in a particular order which corresponds to a song selected by the user. When the user depresses an illuminated key, the Casio product plays the corresponding musical note, and then illuminates the key corresponding to the next musical note in the song. Thus, by successively depressing the illuminated keys, the user plays the selected song.

U.S. Pat. No. 4,968,877 to McAvinney, et al. discloses another example of an electronic musical instrument in the form of an electronic harp. The McAvinney, et al. harp utilizes a neon tube disposed at one end of the harp to generate radiation towards the other end of the harp. The radiation is reflected from the other end of the harp towards an array of radiation detectors disposed between the two ends of the harp. The optical scanning device of the McAvinney, et al. harp senses and tracks the movement of the user's fingers and generates sound in response thereto.

SUMMARY OF THE INVENTION

The invention is directed to a musical toy having a base member, a second member connected to the base member so as to form a substantially unobstructed space between the second member and the base member, a plurality of photoemitters for generating a plurality of radiation beams between the base member and the second member, a plurality of photodetectors for receiving the radiation beams, audio generation means for generating a plurality of musical sounds, and means for causing the audio generation means to generate one of the musical sounds in response to an interruption of one of the radiation beams.

The second member may be composed of a rainbow member comprising a semi-circular shaped member with a plurality of different colored semi-circular stripes disposed thereon and a plurality of star-shaped, visible light-emitting elements disposed on the semi-circular shaped member, each of the star-shaped elements being positioned adjacent one of the radiation beams. The musical toy may include means for causing one of the visible light-emitting members to be illuminated in response to an interruption of the radiation beam associated with the visible light-emitting member.

The musical toy may be provided with a plurality of musical instrument designators, each of which is associated with a different one of the radiation beams and designates a respective one of a plurality of different types of musical instruments. The toy may include audio generation means for generating a plurality of sets of musical sounds, each of the musical sounds within the sets being associated with a respective one of the radiation beams, and each of the sets of musical sounds being associated with a respective one of the different types of musical instruments designated by the musical instrument designators. The toy may also be provided with means for causing the audio generation means to generate musical sounds of one of the sets of musical sounds in response to an interruption of the radiation beam associated with the musical instrument designator which designates the type of musical instrument associated with the one set of musical sounds.

The musical toy may be provided with a plurality of musical song designators, each of the musical song designators being associated with a different one of the radiation beams and designating a respective musical song, and means for causing the audio generation means to generate one of the musical songs in response to an interruption of the radiation beam associated with the musical song designator that designates the one musical song.

These and other features and advantages of the present invention will be apparent to those of ordinary skill in the art in view of the detailed description of the preferred embodiment, which is made with reference to the drawings, a brief description of which is provided below.

DETAILED DESCRIPTION OF A PREFERRED EMBODIMENT

Figure 1:
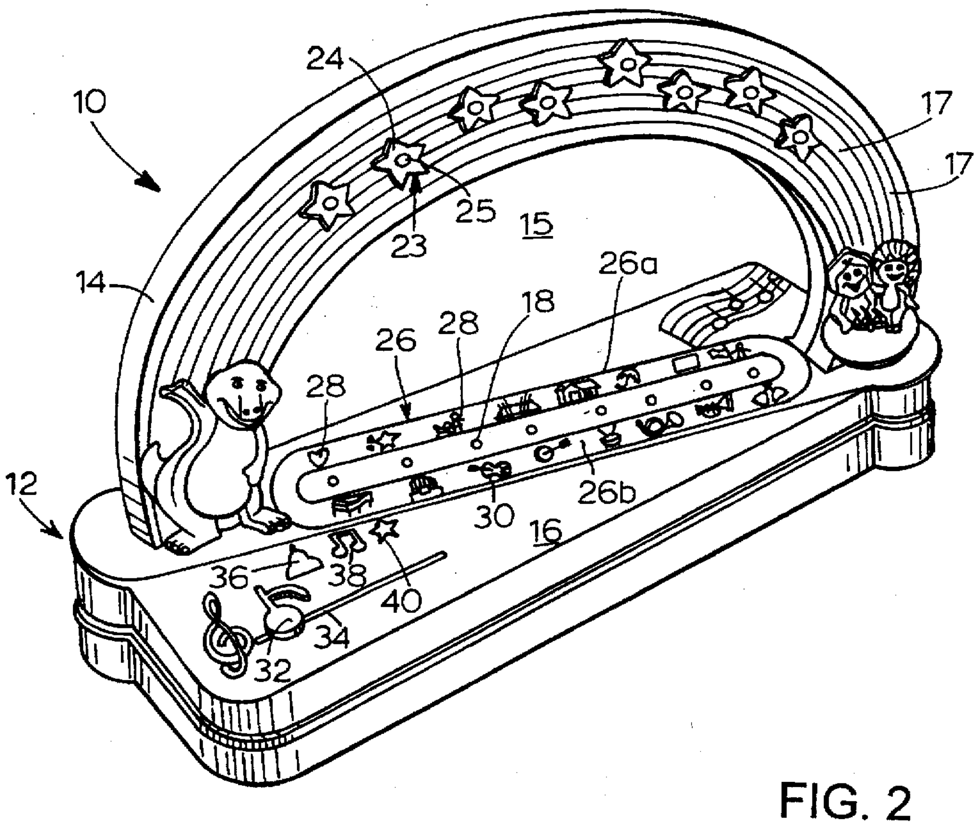
FIG. 1 is a perspective view of a preferred embodiment of a musical toy in accordance with the invention.

A preferred embodiment of a musical rainbow toy 10 in accordance with the invention is shown in FIG. 1. The musical toy 10 is composed of a base member 12 disposed in a generally horizontal position and a semi-circular shaped rainbow member 14 disposed in a generally vertical direction. The base member 12 and the rainbow member 14 may be formed of any suitable material, such as injection-molded plastic. A substantially unobstructed, semi-circular space 15 is formed between the base member 12 and the rainbow member 14. The rainbow member 14 may be provided with a number of different colored semi-circular stripes 17 to emulate a rainbow.

The base member 12 has an upper surface 16 with eight cylindrical holes 18 formed therein. A plurality of photodetectors 20 (FIG. 3) are disposed in the base member 12, each photodetector 20 being positioned directly below a respective one of the holes 18. A plurality of photoemitters 22 (FIG. 3) are disposed in the rainbow member 14, each photoemitter 22 being positioned directly above one of the holes 18 in the base member 12. The holes 18 may be covered with a piece of clear, colorless plastic (not shown) to prevent small objects or particulate matter from falling into the holes 18 and blocking them.

When the toy 10 is turned on, each photoemitter 22 generates a beam of radiation, which is not visible when the musical toy 10 is played, in a downward direction towards a respective one of the holes 18. Since each of the radiation beams is capable of being detected by its corresponding photodetector 20, the photodetectors 20 are capable of detecting when one of the radiation beams is blocked or interrupted, such as by passing a finger or object between the photoemitter 22 which generated the beam and the photodetector 20 which detects the beam.

The photoemitters 22 may be conventional light-emitting diodes (LEDs), and the photodetectors 20 may be conventional phototransistors. As used herein, the term "photoemitter" refers to any device for generating any type of radiation beam, either visible or invisible, that is capable of being detected. As used herein, the term "photodetector" refers to any device that is capable of detecting the presence or absence of any kind of radiation beam. It should be appreciated that, even if a photoemitter that generates visible light (e.g. a red LED) is used, the radiation beam generated by the photoemitter will generally not be visible when used in a lighted environment.

Instead of utilizing multiple photoemitters, a single photoemitter could be used with a plurality of photodetectors, in which case a radiation beam would be generated along the path between each photodetector and a point on the photoemitter.

When the musical toy 10 is turned on, the photoemitters 22 generate eight vertical, substantially parallel radiation beams which may be temporarily blocked or interrupted by the child playing with the toy 10. Each radiation beam is associated with a unique one of eight musical sounds or notes, and by selectively blocking the radiation beams, the child may play individual musical notes or different songs via a loudspeaker 19 (FIG. 3) disposed in the interior of the base member 12. The duration for which the musical sounds or notes are played may correspond to the length of time that the radiation beams are interrupted.

The rainbow member 14 is provided with a plurality of lights 23, each of which is positioned adjacent and associated with one of the radiation beams. Each light 23 is composed of a clear, colorless plastic star 24 which covers an LED 25. When the radiation beam associated with one of the LEDs 25 is interrupted, that LED 25 is illuminated.

Depending on the mode of operation of the musical toy 10, as described below, the interruption of the radiation beam may simultaneously cause a musical sound or note to be played and one of the star lights 23 to be illuminated, or the star lights 23 may be selectively illuminated to signal or prompt the child to interrupt the particular radiation beam associated with the illuminated light 23. Each of the LEDs 25 may generate light of a unique color to provide a visually pleasing effect.

Figure 2:
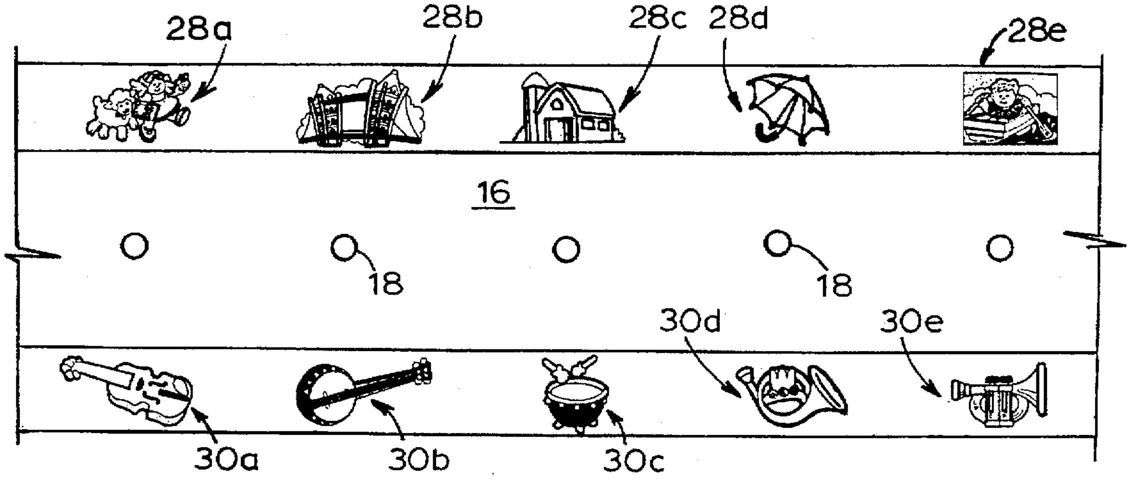
FIG. 2 is a top view of a portion of the base member of the musical toy.

Referring to FIGS. 1 and 2, the upper surface 16 of the base member 12 has an oval-shaped decal 26 disposed thereon. The decal 26 has a first half **26*a* on which eight musical song designators 28 are printed and a second half 26*b* on which eight musical instrument designators 30 are printed. Each of the song designators 28** comprises a visual image representing a particular song.

For example, as shown in FIG. 2, the song designators 28 may include a visual image **28*a* of a girl and a lamb (which represents the song "Mary had a Little Lamb"), a visual image 28*b* of a bridge ("London Bridges Falling Down"), a visual image 28*c* of a barn ("Farmer in the Dell"), a visual image 28*d* of an umbrella, and a visual image 28*e*** of a child in a rowboat.

Each of the musical instrument designators 30 comprises a visual image of a different musical instrument, such as a visual image **30*a* of a violin, a visual image 30*b* of a banjo, a visual image 30*c* of a drum, a visual image 30 d of a French horn, and a visual image 30*e* of a trumpet. Each of the song designators 28 and musical instrument designators 30 is positioned adjacent one of the holes 18 in the base member 12**, and thus adjacent one of the radiation beams.

A mode-select switch 32 is positioned within a slot 34 in the upper surface 16 of the base member 12. The mode-select switch 32 is movable to one of three positions, with each position corresponding to one of three operating modes. The three possible positions of the mode-select switch 32 are identified by a number of unique mode designators, including a designator 36 in the shape of a bell, a designator 38 in the shape of a musical note, and a designator 40 in the shape of a star. Alternatively, the mode-select switch 32 could be provided as three separate pushbuttons located on the upper surface of the base member 12.

As described in more detail below, when the mode-select switch 32 is positioned adjacent the bell designator 36, the musical toy 10 operates in its first mode in which, each time one of the radiation beams is interrupted by the child, the toy 10 plays the musical note associated with the interrupted radiation beam. When the mode-select switch 32 is positioned adjacent the musical note designator 38, the musical toy 10 operates in its second mode in which the musical toy 10 automatically plays one of a number of various songs, as selected by the child, and also simultaneously plays musical notes corresponding to the radiation beams interrupted by the child.

When the mode-select switch 32 is positioned adjacent the star designator 40, the musical toy 10 operates in its third mode in which the musical toy 10 illuminates the star lights 23 on the rainbow member 14, one at a time, in a particular order which corresponds to a song selected by the child. When the child interrupts the radiation beam corresponding to the illuminated light 23, the musical toy 10 plays the corresponding musical note, and then illuminates the star light 23 corresponding to the next musical note in the song. Thus, by successively interrupting the radiation beams associated with the illuminated lights, the child plays the selected song.

Figure 3:
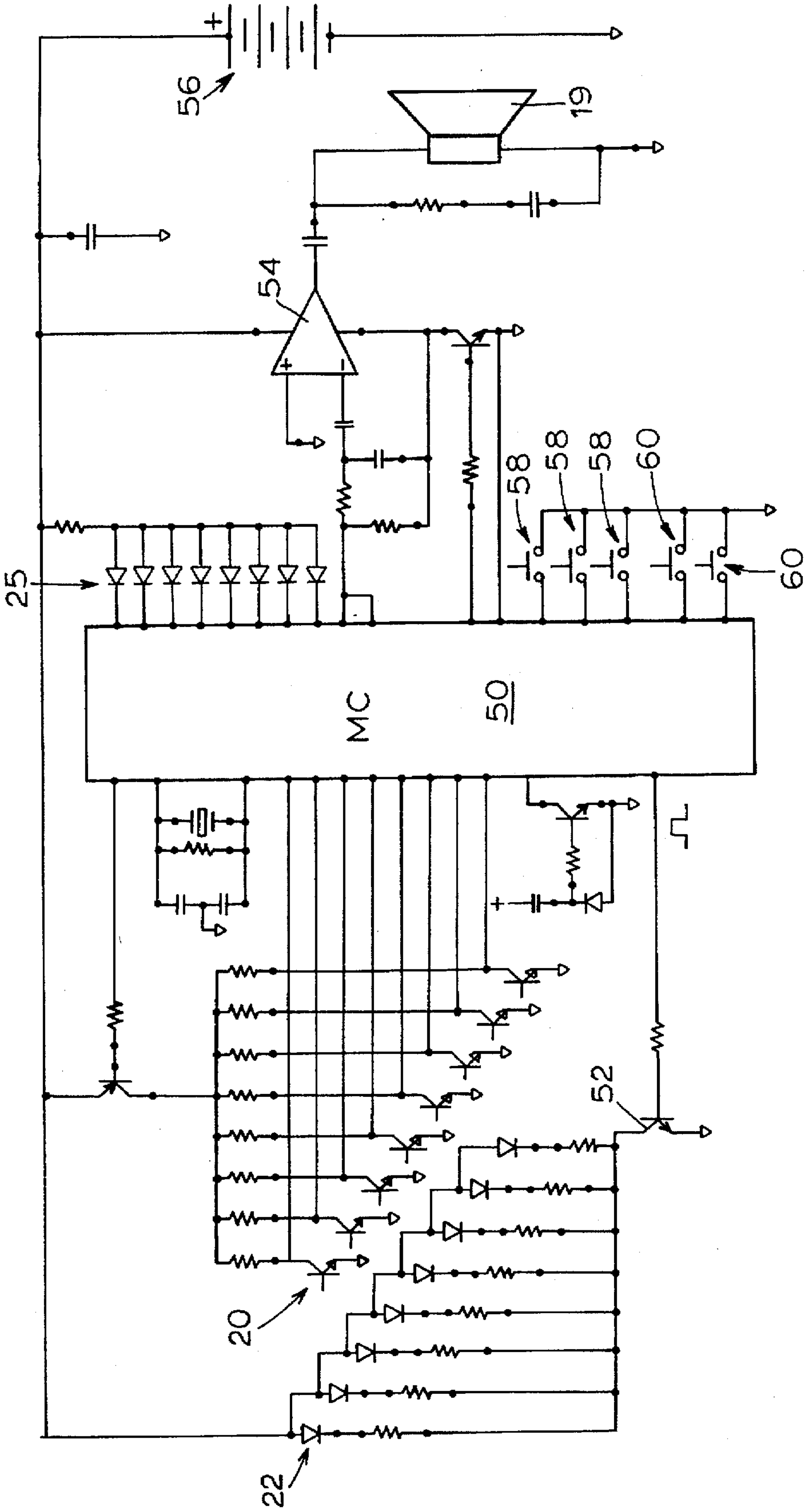
FIG. 3 is a circuit diagram of the electronics of the musical toy.

A circuit diagram of the electronics of the musical toy 10 is shown in FIG. 3. The electronics, which are mounted to a printed circuit board (not shown) disposed in the interior of the base member 12, include a microcontroller 50 which periodically reads the status of each of the photodetectors 20 to determine if one of the radiation beams has been interrupted and which may selectively illuminate any of the LEDs 25 of the star lights 23. The microcontroller 50 may cause the photoemitters 22 to be periodically illuminated or pulsed at a relatively high rate, e.g. 55 Hz, via a switching transistor 52 controlled by the microcontroller 50, or alternatively, the photoemitters 22 may be constantly illuminated.

The loudspeaker 19, which is driven by an amplifier 54, generates audible individual musical notes or entire songs based on a conventional audio synthesizer circuit (not specifically shown) in the microcontroller 50. The musical toy 10, which is powered by a battery 56, may be provided with a power-saving mode of operation in which a portion of the electrical current-consuming components are temporarily shut off under certain conditions, for example, if the child does not generate any input, e.g. interrupt a radiation beam, to the toy 10 after a predetermined period of time.

The toy 10 is provided with three electrical switches 58 which are activated by the mode-select switch 32 and which specify the current one of the three operational modes of the toy 10 described above. The toy 10 may include additional switches 60 useful for other purposes, such as volume control.

The micro controller 50 incorporates a number of conventional components (not individually shown), including a microprocessor, a random-access memory (RAM), a read-only memory (ROM), an audio synthesizer circuit, and an input/output (I/O) circuit, all of which are interconnected via an address/data bus. The operation of the musical toy 10 is controlled by a computer program stored in the ROM and executed by the microprocessor.

Figure 4A:
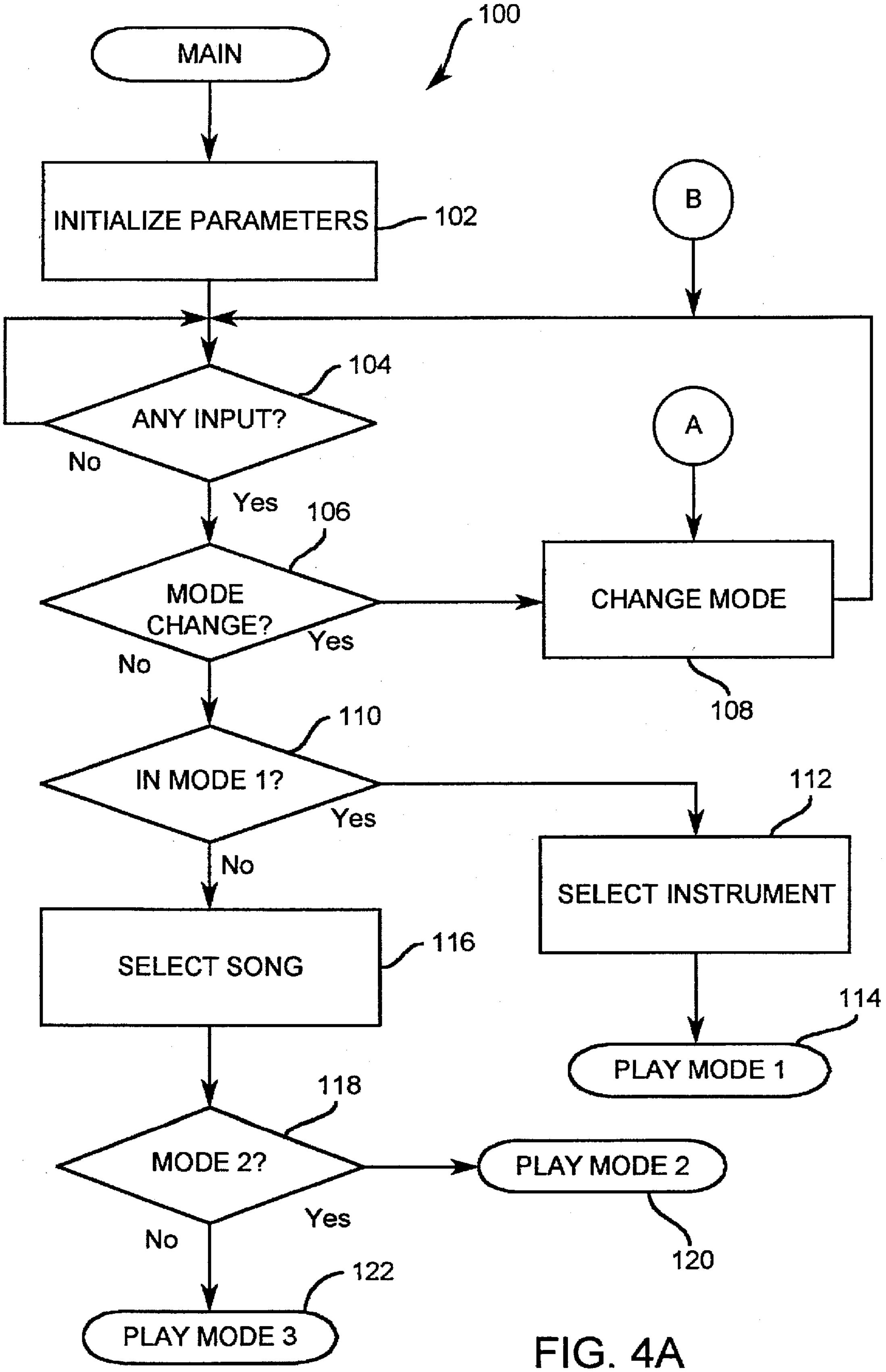
FIGS. 4A–4D illustrate a flowchart of a computer program which controls the operation of the musical toy.

A flowchart of the computer program is illustrated in FIGS. 4A–4D. Referring to FIG. 4A, the computer program includes a main routine 100 which is performed when the power switch (not shown) of the musical toy 10 is turned on. At step 102, a number of parameters are initialized, and the musical notes to be generated by the loudspeaker 19 are preselected to correspond to a predetermined type of musical instrument.

At step 104, the program waits for the child to make an input. This input may take the form of an interruption of one of the radiation beams or a changing of the position of the mode-select switch 32. Upon detection of an input, the program branches to step 106, where it is determined whether the input was in the form of a change of position of the mode-select switch 32. If so, the program branches to step 108 where the current mode (as stored in the RAM) is changed to correspond to the new mode. The program then branches back to step 104 where it waits for additional input.

At step 106, if the input was not a mode change, meaning that the input was the interruption of one of the radiation beams, then the program branches to step 110. At step 110, if the current mode is Mode 1 (the first operating mode described above), the program branches to step 112 where the musical instrument designated by the instrument designator 30 disposed adjacent the interrupted radiation beam is selected, after which all musical notes generated by the speaker 19 will correspond to that selected musical instrument. The program then branches to a play routine 114 for Mode 1.

If the current mode was not Mode 1 as determined at step 110, meaning the current mode is either Mode 2 or Mode 3 (the second or third operating modes, respectively, described above), the program branches to step 116 where the song designated by the song designator 28 disposed adjacent the interrupted radiation beam is selected. At step 118, if the current mode is Mode 2, the program branches to a play routine 120 for Mode 2. If not, the program branches to a play routine 122 for Mode 3.

Figure 4B:
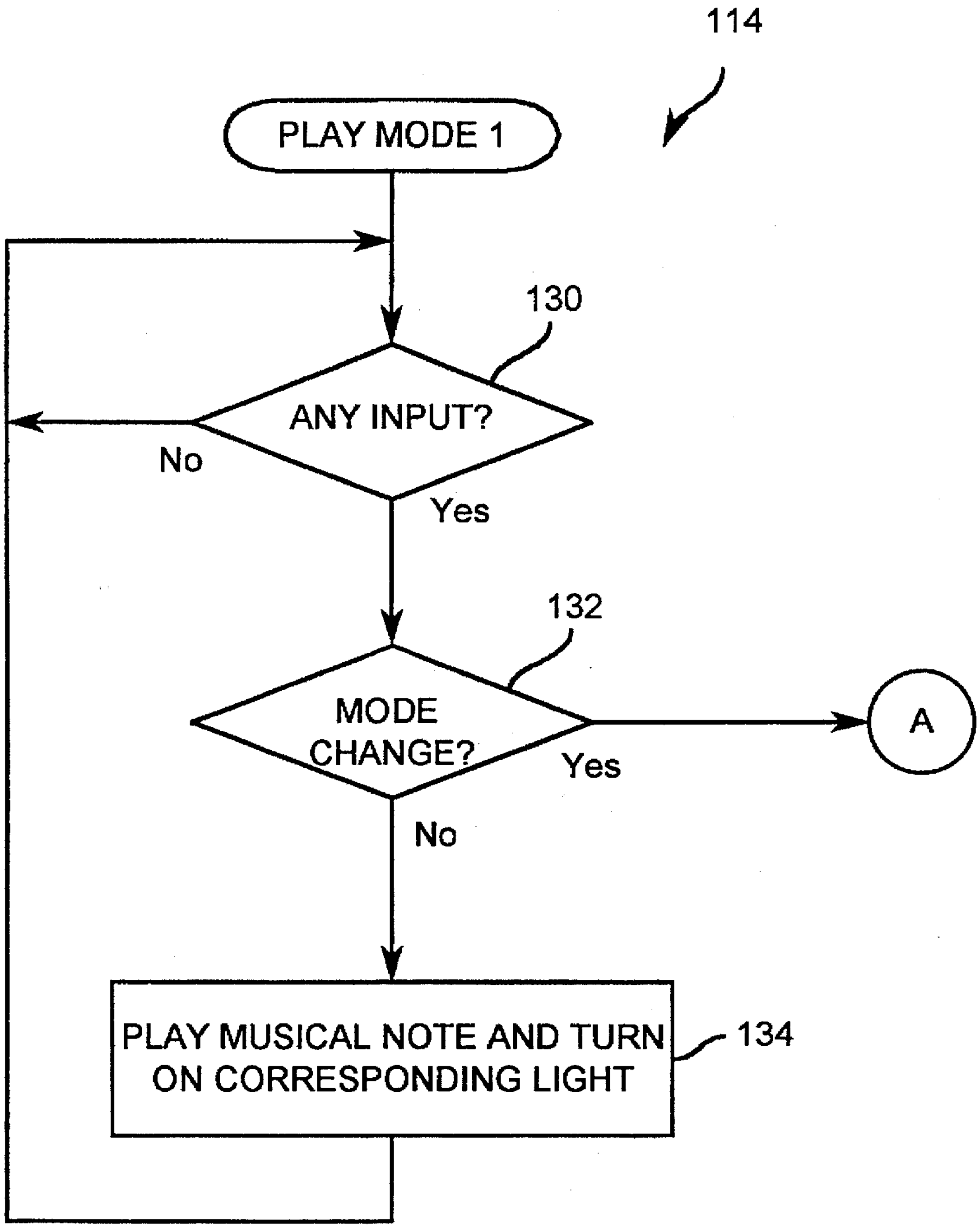

FIG. 4B is a flowchart of the play routine 114 for Mode 1. Referring to FIG. 4B, at step 130, the program waits for input from the child. Upon receiving an input (either an interruption of one of the radiation beams or a positional change of the mode-select switch 32 ), the program branches to step 132. At step 132, if the input was a mode change, the program branches back to step 108 of FIG. 4A where the mode is changed. If the input was not a mode change, meaning that one of the radiation beams was interrupted, the program branches to step 134 where the musical note associated with the interrupted radiation beam is generated by the speaker 19 and where the star light 23 associated with the interrupted radiation beam is illuminated. The program then branches back to step 130 where it waits for the next input. If the child does not make any input in Mode 1 within a predetermined period of time, the program may branch back to step 104 of FIG. 4A and transition to a power-saving sleep mode in which it remains until another input is made at step 104 of FIG. 4A.

Figure 4C:
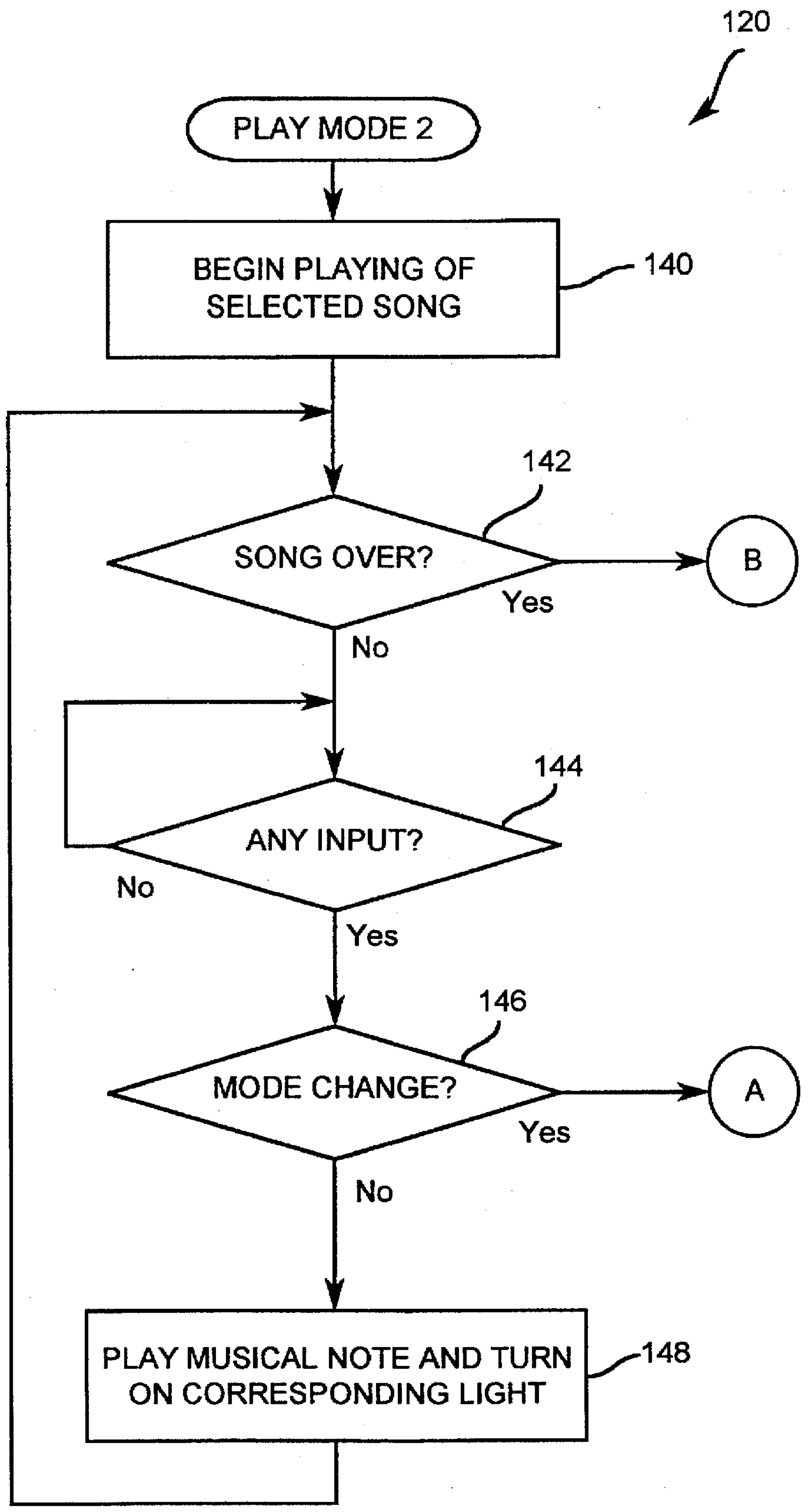

FIG. 4C is a flowchart of the play routine 120 for Mode 2. Referring to FIG. 4C, at step 140 the musical toy 10 begins playing the song selected at step 116 of FIG. 4A. At step 142, if the song has not finished playing, the program branches to step 144, where it waits for input from the child. Upon receiving an input, the program branches to step 146. At step 146, if the input was a mode change, the program branches back to step 108 of FIG. 4A where the mode is changed. If the input was not a mode change, meaning that one of the radiation beams was interrupted, the program branches to step 148 where the musical note associated with the interrupted radiation beam is generated by the speaker 19 and where the star light 23 associated with the interrupted radiation beam is illuminated.

Figure 4D:
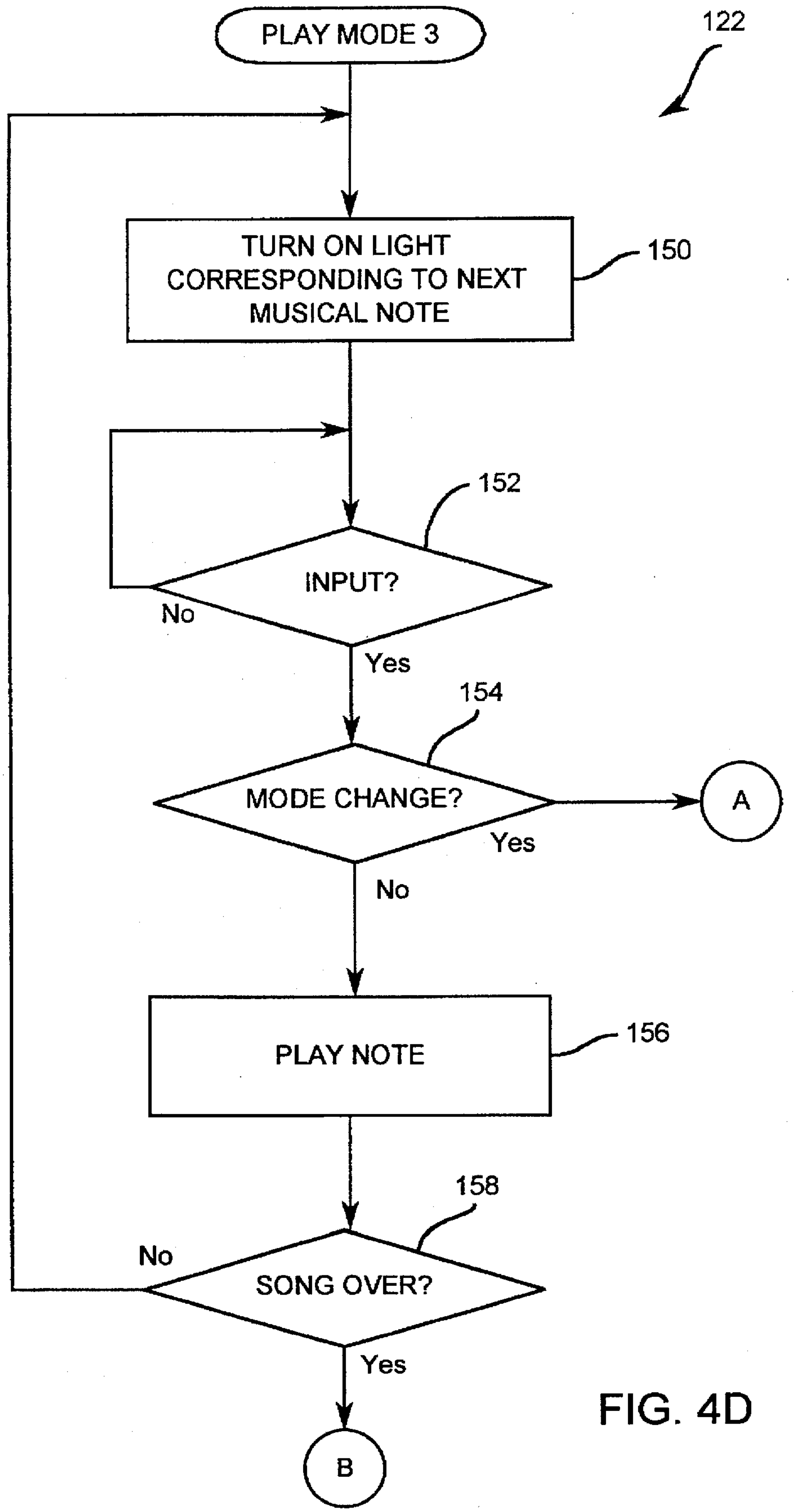

FIG. 4D is a flowchart of the play routine 122 for Mode 3. Referring to FIG. 4D, at step 150 the musical toy 10 turns on the light 23 which corresponds to the first (or next) musical note in the song to be played (which song was selected at step at step 116 of FIG. 4A). At step 152, the program waits for input from the child. Upon receiving an input, the program branches to step 154. At step 154, if the input was a mode change, the program branches back to step 108 of FIG. 4A where the mode is changed. If the input was not a mode change, the program branches to step 156 where the next musical note, i.e. the musical note associated with the light 23 turned on during step 150, is generated by the speaker 19. The program then branches to step 158, where it determines if the song is over. If the song is not over, the program branches back to step 150, where the light 23 for the next musical note in the song is illuminated. If the song is over, the program branches back to step 104 of FIG. 4A.

It should be noted that, in the operation described above, the musical toy 10 will play the note at step 156 regardless of which radiation beam is interrupted by the child. Depending on the age and/or skill level of the child, the toy 10 may alternatively be designed to play the note at step 156 only if the child interrupts the radiation beam corresponding to the light 23 illuminated at step 150, since this requirement will more readily teach the child how to play the song.

In addition to the musical notes played during the repeated performance of step 156, the musical toy 10 can play background music.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A musical rainbow toy, comprising:

a base member;

a semi-circular rainbow member connected to said base member so as to form a substantially unobstructed semi-circular space between said rainbow member and said base member;

means for generating a plurality of radiation beams between said base member and said semi-circular rainbow member;

a plurality of photodetectors, each of said photodetectors positioned to receive a respective one of said radiation beams;

a plurality of visible light-emitting members, each of said visible light-emitting members being associated with a respective one of said radiation beams;

a plurality of musical instrument designators, each of said musical instrument designators being associated with a different one of said radiation beams and designating a respective one of a plurality of different types of musical instruments;

audio generation means for generating a plurality of sets of musical sounds, each of said musical sounds within said sets being associated with a respective one of said radiation beams and each of said sets of musical sounds being associated with a respective one of said different types of musical instruments designated by said musical instrument designators;

means for causing said audio generation means to generate musical sounds of one of said sets of musical sounds in response to an interruption of said radiation beam associated with said musical instrument designator which designates said type of musical instrument associated with said one set of musical sounds;

means for causing said audio generation means to generate one of said musical sounds in response to an interruption of said radiation beam associated with said one musical note; and means for causing one of said visible light-emitting members to be illuminated in response to an interruption of said radiation beam associated with said one visible light-emitting member.

2. A musical toy as defined in claim 1 wherein said audio generation means comprises means for generating a plurality of different musical songs, said musical toy additionally comprising:

a plurality of musical song designators, each of said musical song designators being associated with a different one of said radiation beams and designating a respective one of said musical songs; and means for causing said audio generation means to generate one of said musical songs in response to an interruption of said radiation beam associated with said musical song designator that designates said one musical song.

3. A musical toy as defined in claim 1 wherein said means for generating said radiation beams comprises a plurality of photoemitters disposed on said semi-circular rainbow member and wherein each of said photoemitters generates a radiation beam in a downward direction towards said base member.

4. A musical toy, comprising:

a base member;

a second member connected to said base member so as to form a substantially unobstructed space between said second member and said base member;

means for generating a plurality of radiation beams between said base member and said second member;

a plurality of photodetectors, each of said photodetectors positioned to receive a respective one of said radiation beams;

a plurality of musical instrument designators, each of said musical instrument designators being associated with a different one of said radiation beams and designating a respective one of a plurality of different types of musical instruments;

audio generation means for generating a plurality of sets of musical sounds, each of said musical sounds within said sets being associated with a respective one of said radiation beams and each of said sets of musical sounds being associated with a respective one of said different types of musical instruments designated by said musical instrument designators;

means for causing said audio generation means to generate musical sounds of one of said sets of musical sounds in response to an interruption of said radiation beam associated with said musical instrument designator which designates said type of musical instrument associated with said one set of musical sounds; and means for causing said audio generation means to generate one of said musical sounds in response to an interruption of said radiation beam associated with said one musical note.

5. A musical toy as defined in claim 4 additionally comprising:

a plurality of visible light-emitting members, each of said visible light-emitting members being associated with a respective one of said radiation beams; and means for causing one of said visible light-emitting members to be illuminated in response to an interruption of said radiation beam associated with said one visible light-emitting member.

6. A musical toy as defined in claim 4 wherein said audio generation means comprises means for generating a plurality of different musical songs, said musical toy additionally comprising:

a plurality of musical song designators, each of said musical song designators being associated with a different one of said radiation beams and designating a respective one of said musical songs; and means for causing said audio generation means to generate one of said musical songs in response to an interruption of said radiation beam associated with said musical song designator that designates said one musical song.

7. A musical toy as defined in claim 4 wherein said second member comprises:

a semi-circular shaped member having a plurality of different colored semi-circular stripes disposed thereon; and a plurality of star-shaped elements disposed on said semi-circular shaped member, each of said star-shaped elements being positioned adjacent one of said radiation beams.

8. A musical toy as defined in claim 4 wherein said base member is disposed in a generally horizontal plane and wherein said second member comprises a semi-circular shaped rainbow member disposed in a generally vertical plane.

9. A musical toy as defined in claim 4 wherein said musical instrument designators are disposed on said base member.

10. A musical toy as defined in claim 4 wherein each of said musical instrument designators comprises a visual image of one of said musical instruments.

11. A musical toy, comprising:

a base member;

a second member connected to said base member so as to form a substantially unobstructed space between said second member and said base member;

means for generating a plurality of radiation beams between said base member and said second member;

a plurality of photodetectors, each of said photodetectors positioned to receive a respective one of said radiation beams;

a plurality of musical song designators, each of said musical song designators being associated with a different one of said radiation beams and designating a respective one of a plurality of different musical songs;

audio generation means for generating said musical songs; and means for causing said audio generation means to generate one of said musical songs in response to an interruption of said radiation beam associated with said musical song designator that designates said one musical song.

12. A musical toy as defined in claim 11 wherein said base member is disposed in a generally horizontal plane and wherein said second member comprises a semi-circular shaped rainbow member disposed in a generally vertical plane.

13. A musical toy as defined in claim 11 wherein said musical song designators are disposed on said base member.

14. A musical toy as defined in claim 11 wherein each of said song designators comprises a visual image representing one of said musical songs.

15. A musical toy, comprising:

a base member;

a second member connected to said base member so as to form a substantially unobstructed space between said second member and said base member;

means for generating a plurality of radiation beams between said base member and said second member;

a plurality of photodetectors, each of said photodetectors positioned to receive a respective one of said radiation beams;

audio generation means for generating a plurality of musical sounds, each of said musical sounds being associated with a respective one of said radiation beams; and means for causing said audio generation means to generate one of said musical sounds in response to an interruption of said radiation beam associated with said one musical note.

16. A musical toy as defined in claim 15 wherein said audio generation means is operable in a first mode in which said audio generation means generates one of a plurality of musical songs and a second mode in which said audio generation means generates musical sounds in response to interruption of said radiation beams, said musical toy additionally comprising a switch for selecting said first mode of operation or said second mode of operation.

17. A musical toy as defined in claim 15 wherein said base member is disposed in a generally horizontal plane and wherein said second member comprises a semi-circular shaped rainbow member disposed in a generally vertical plane.

* * * * *